United States Patent
Docter et al.

(10) Patent No.: US 7,481,856 B2
(45) Date of Patent: Jan. 27, 2009

(54) REACTOR FOR AUTOTHERMAL REFORMING OF HYDROCARBONS

(75) Inventors: Andreas Docter, Esslingen (DE); Bernhard Vogel, Stuttgart (DE); Steffen Oliver Wieland, Wetzlar (DE)

(73) Assignee: Daimler AG, Stuttgart (DE)

( * ) Notice: Subject to any disclaimer, the term of this patent is extended or adjusted under 35 U.S.C. 154(b) by 281 days.

(21) Appl. No.: 10/309,531

(22) Filed: Dec. 4, 2002

(65) Prior Publication Data

US 2003/0115799 A1 Jun. 26, 2003

(30) Foreign Application Priority Data

Dec. 5, 2001 (DE) .................. 101 59 735

(51) Int. Cl.
*B01J 7/00* (2006.01)
(52) U.S. Cl. ............... 48/61; 48/75; 48/63; 48/93; 48/94; 48/127.9; 422/198; 422/200; 422/211; 422/212; 165/145
(58) Field of Classification Search ......... 422/188–193, 422/198, 200–202, 204, 211, 222
See application file for complete search history.

(56) References Cited

U.S. PATENT DOCUMENTS

| | | | | |
|---|---|---|---|---|
| 3,098,477 A | * | 7/1963 | Lotter | 126/41 R |
| 3,322,179 A | * | 5/1967 | Goodell | 431/153 |
| 3,472,601 A | * | 10/1969 | Yamamura et al. | 431/328 |
| 3,855,001 A | * | 12/1974 | Cheron | 429/26 |
| 4,302,292 A | | 11/1981 | von Waclawiczek et al. | 376/325 |
| 4,932,981 A | * | 6/1990 | Ohsaki et al. | 48/94 |
| 5,639,431 A | * | 6/1997 | Shirasaki et al. | 422/212 |
| 5,772,707 A | | 6/1998 | Wiesheu et al. | 48/197 |
| 6,063,515 A | | 5/2000 | Epp et al. | 429/17 |
| 6,096,286 A | | 8/2000 | Autenrieth | 423/651 |
| 6,264,856 B1 | | 7/2001 | Autenrieth et al. | 252/373 |
| 6,277,339 B1 | | 8/2001 | Boneberg et al. | 422/198 |
| 6,383,468 B1 | | 5/2002 | Schuessler et al. | 423/651 |
| 6,645,443 B1 | | 11/2003 | Vogel et al. | 422/200 |
| 6,887,286 B1 | | 5/2005 | Taki et al. | 48/197 |
| 2001/0024629 A1 | * | 9/2001 | Brauchle et al. | 422/198 |
| 2002/0007595 A1 | | 1/2002 | Maier-Roeltgen et al. | 48/116 |

FOREIGN PATENT DOCUMENTS

| | | |
|---|---|---|
| DE | 19526886 | 9/1996 |
| DE | 19624433 | 12/1997 |
| DE | 19620378 | 1/1998 |
| DE | 19713242 | 10/1998 |

(Continued)

*Primary Examiner*—Alexa D. Neckel
*Assistant Examiner*—Kaity V. Handal
(74) *Attorney, Agent, or Firm*—Davidson, Davidson & Kappel, LLC

(57) ABSTRACT

A reactor for autothermal reforming of hydrocarbons that allows a reduction of excess-air factor $\phi$ during the reforming without resulting in a reduced conversion of the hydrocarbons in an end region of the reaction zone. The reactor includes at least one reaction zone in which is arranged at least one catalyst structure for the reformation so that the educts involved in the reformation are converted while flowing through the reaction zone. A heating device is included for heating the end region of the reaction zone to accelerate the conversion of the hydrocarbons.

13 Claims, 4 Drawing Sheets

FOREIGN PATENT DOCUMENTS

| | | |
|---|---|---|
| DE | 19727841 | 1/1999 |
| DE | 19746251 | 4/1999 |
| DE | 19755814 | 11/1999 |
| DE | 19832386 | 1/2000 |
| DE | 100 23 410 A1 | 11/2001 |
| EP | 1 103 518 A | 5/2001 |
| EP | 1104039 | 5/2001 |
| FR | 2 733 166 A | 10/1996 |
| WO | 9852868 | 11/1998 |
| WO | WO 9858874 A1 * | 12/1998 |
| WO | WO 02/053492 | 7/2002 |

* cited by examiner excess-air factor ϕ small

REACTOR FOR AUTOTHERMAL REFORMING OF HYDROCARBONS

CROSS-REFERENCE TO RELATED APPLICATIONS

This application claims priority to German Patent Application No. 101 59 735.5, filed Dec. 5, 2001, which is incorporated by reference herein.

BACKGROUND

The present invention relates to a reactor for autothermal reforming of hydrocarbons, including at least one reaction zone in which is arranged at least one catalyst for the reformation so that the educts involved in the reformation are converted while flowing through the reaction zone.

Such reactors are particularly suitable for applications with high demands on the rate of load changes as, for example, in fuel cell systems because they feature high dynamic response and good cold-start ability.

During the autothermal reforming of hydrocarbons, the fuel is reacted with atmospheric oxygen and water vapor to form a hydrogen-containing gas mixture. Apart from the endothermic reforming reactions of the hydrocarbons with water vapor,

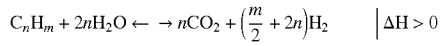
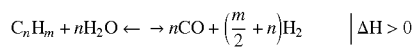

which proceed quasi-adiabatically and therefore involve a decrease in temperature, exothermic, so-called "partial oxidation reactions" occur in the process,

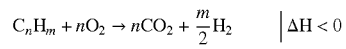
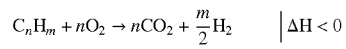

which at least partially compensate for the decrease in temperature by the endothermic reactions. Thus the thermal energy required for the endothermic reforming of the hydrocarbons can be provided by the exothermic partial oxidation of the hydrocarbons which takes place at the same time.

The complete oxidation of a hydrocarbon $C_nH_m$ can generally be described as follows:

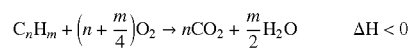

This complete oxidation is characterized by the fact that the so-called "excess-air factor" $\phi$ takes the value 1 ($\phi=1$). Excess-air factor $\phi$ is defined as follows:

$$\phi = \frac{\text{quantity of oxygen fed to the reaction}}{\text{quantity of oxygen required for complete oxidation}}$$

In autothermal reforming, oxygen is usually fed substoichiometrically. In this process, excess-air factor $\phi$ is typically in the range $$0.25 < \phi < 0.35$$

At constant temperature, the $H_2$- and CO-yields are theoretically higher at smaller excess-air factors. In practice, however, a lower temperature results at smaller excess-air factors which is why, in the limiting case, the $H_2$- and CO-yields decrease again due to the lower reaction rate.

In the subsequent gas treatment, resulting unwanted CO is reacted with $H_2O$ in a water gas shift reaction to form $CO_2$ and $H_2$.

$$CO + H_2O \leftrightarrow CO_2 + H_2 \quad |\Delta H < 0$$

Due to faster reaction kinetics, the exothermic oxidation reactions take place to a greater extent in the entry zone of the reactor, involving a marked increase in temperature in this region. The endothermic reforming reactions take place predominantly in the downstream reaction zone in which the temperature consequently decreases.

A sufficient reaction rate is crucial for the complete conversion of the hydrocarbons on the catalyst, the reaction rate depending on its rate constant k and the concentration of the educt components for a given chamber. Rate constant k is temperature-dependent, it being possible to describe the temperature dependence at least approximately by the Arrhenius equation $$k = A \cdot e^{-\frac{E_a}{RT}}$$

(A=Arrhenius factor, $E_a$=activation energy, R=gas constant, T=temperature). In the entry zone of the reactor, the reaction rates of the hydrocarbons are usually sufficiently high due to the high educt concentrations and the fast oxidation reactions occurring there. The heat released by the oxidation reactions can produce temperatures of 900-1000° C. here. In contrast to this, the reaction rates in the exit zone of the reactor are relatively low which is attributable to the conversion-related reduced educt concentrations and to lower temperatures in this region.

At smaller excess-air factors as, for example, $\phi=0.25$, the increase in temperature in the entry zone of the reactor is less pronounced. In this case, moreover, the temperature in the exit zone can decrease due to the endothermic reformation to such an extent that the high reaction rates required for complete conversion of the hydrocarbons are no longer reached. In this case, the $H_2$-Yield decreases and residual hydrocarbons remain in the product gas.

The conversion of the residual hydrocarbons could be kinetically favored by injecting secondary air, that is, by increasing excess-air factor $\phi$ in the end region of the reactor. To this end, however, the secondary air would have to be compressed, involving an additional expenditure of not immediately available electric energy for a corresponding compressor.

This turns out to be problematic, especially also when using such reactors for autothermal reforming of hydrocarbons within the framework of pressurized fuel cell systems. Here, apart from the fuel cell air, the reformer educt air must also be compressed to system pressure through energy-consuming compression. The electric power consumption of the compressor required for this reduces the attainable efficiency of the fuel cell system.

SUMMARY OF THE INVENTION

An inventive concept of a reactor for autothermal reforming of hydrocarbons allows a reduction of excess-air factor $\phi$ during the reforming and thus a reduction of the energy consumption for air compression without resulting in a reduced conversion of the hydrocarbons in the end region of the reaction zone.

The present invention provides a heating device for heating the end region of the reaction zone to accelerate the conversion of the hydrocarbons. Specifically, the present invention provides a reactor for autothermal reforming of hydrocarbons, including at least one reaction zone (1) in which is arranged at least one catalyst (3, 4) for the reformation so that the educts involved in the reformation are converted while flowing through the reaction zone (1). Provision is made for heating means for heating the end region (5) of the reaction zone (1) to accelerate the conversion of the hydrocarbons.

Thus, according to the present invention, a hybrid concept is proposed according to which a reactor for autothermal reforming of hydrocarbons is combined with an external heating device. Unlike the autothermally generated heat, the heat released by the external heating device is not generated directly in the reaction zone at the location of the reforming reactions but has to be transferred to the reaction zone through heat-conductive walls. According to the present invention, the intention is for such a heat supply to take place in the end region of the reaction zone since, especially in the end region of the reaction zone, the educt concentrations and the autothermally generated heat are often not sufficient for complete conversion of the hydrocarbons. Moreover, it has been discovered that the conversion of the hydrocarbons can not only be kinetically favored by increasing excess-air factor $\phi$ but also by supplying thermal energy.

This measure according to the present invention turns out to be advantageous in several respects. It favors the complete conversion of the residual hydrocarbons in the end region of the reaction zone and therefore results in a high $H_2$-yield. Since the reactor according to the present invention can be operated at a relatively small excess-air factor $\phi$, a comparatively small amount of nitrogen gets into the product gas, which altogether results in higher $H_2$-concentrations. Finally, it should also be noted that the expenditure of electric energy for a possible air compression can be reduced due to the measure according to the present invention.

Basically, there are different ways to implement a reactor according to the present invention for autothermal reforming of hydrocarbons and, in particular, to implement and arrange the external heating device.

It is particularly advantageous if the external heating device includes a catalytic radiant burner. Such a burner can be supplied, for example, by the exhaust-gas flows of a gas-treatment unit connected downstream of the reactor as, for example, by the retentate of membrane assemblies or the purge flow of pressure-swing adsorbers. This allows exhaust-gas flows to be thermally used while at the same time minimizing the emissions of the system. If the inventive reactor forms part of a fuel cell system, then the diluted off-gas flows of the fuel cell anode, which still contain combustion gas, can also be used for externally heating the reaction zone using a catalytic radiant burner. In this case too, the catalytic radiant burner contributes to minimizing the system emissions.

BRIEF DESCRIPTION OF THE DRAWINGS

As already illustrated by the above explanations, the teaching of the present invention can be advantageously embodied and refined in different ways. In this regard, on one hand, reference is made to the patent claims and, on the other hand, to the following description of several exemplary embodiments of the present invention with reference to the Figures, in which:

DETAILED DESCRIPTION

The four variants of a reactor according to the present invention, which are described below, are shown in FIGS. 1 through 4 in a schematic cross-sectional view, respectively. They differ from each other mainly in the arrangement and design of the external heating means.

Each of the four Figures shows a reactor for autothermal reforming of hydrocarbons which includes a reaction zone 1. Located in reaction zone 1 is in each case at least one catalyst structure 3, 4 so that the educts involved in the reformation are converted while flowing through reaction zone 1.

According to the present invention, an external heating device for heating end region 5 of reaction zone 1 is provided in all four variants shown to accelerate and thereby to improve the conversion of the hydrocarbons.

Within the scope of the present invention, end region 5 of reaction zone 1 can, in principle, be heated using any desired heating device. In all four cases shown, these heating devices include a catalytic radiant burner 6.

Figure 1:
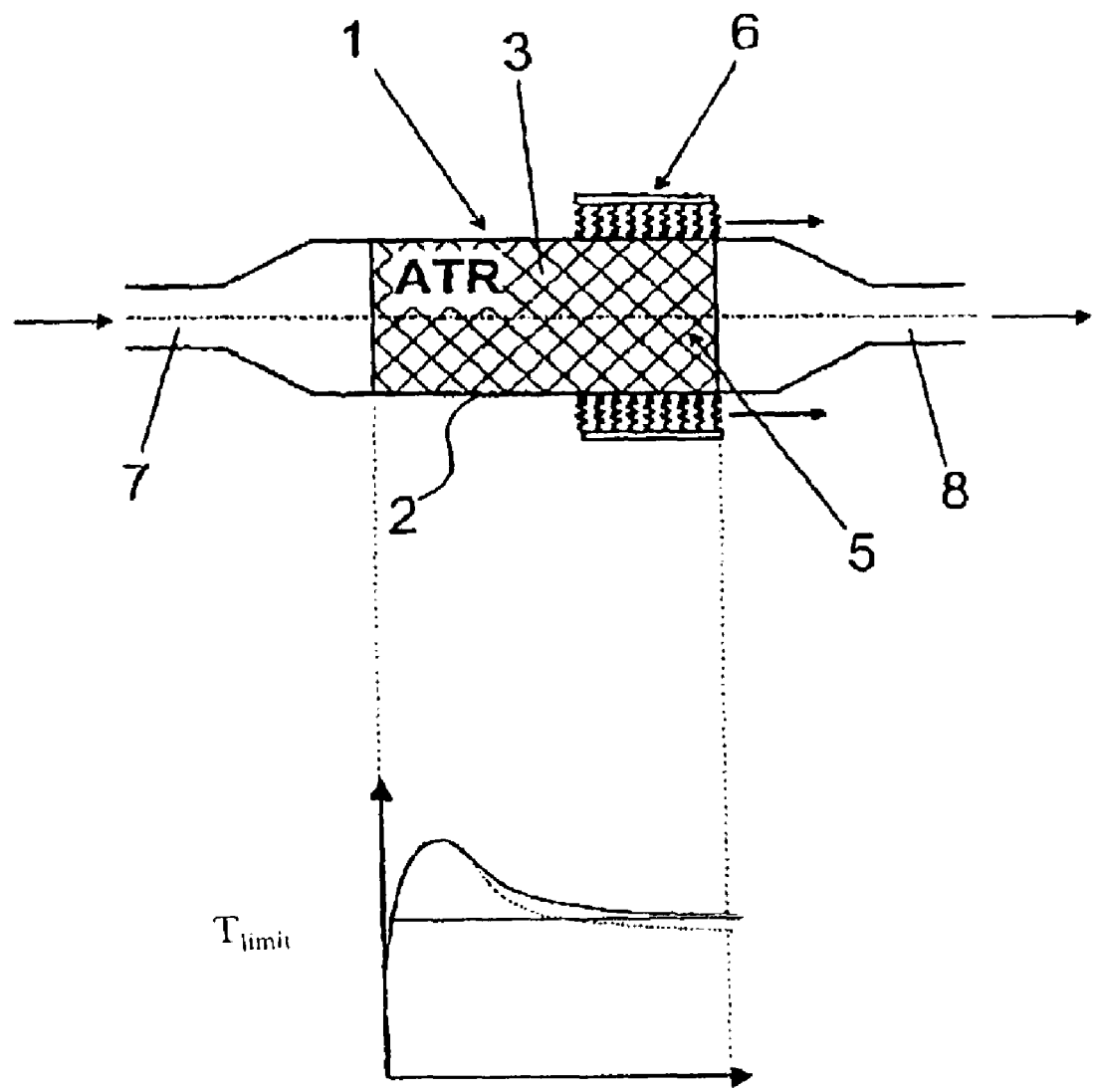
FIG. 1    shows a first variant of a reactor according to the present invention in conjunction with the associated qualitative temperature profile in the direction of the reaction path.

In the variant of an inventive reactor shown in FIG. 1, a catalytic radiant burner 6 is arranged on the outside of the wall 2 surrounding reaction zone 1, namely in end region 5 of reaction zone 1. The conditions for optimum heat transfer into reaction zone 1 are the temperature gradient from radiant burner 6 to wall 2 and good radial thermal conductivity of catalyst structure 3 or a small radial extent thereof.

As already mentioned, the qualitative temperature profile in the direction of the reaction path which is associated with the reactor shown in the upper part of FIG. 1 is depicted in the lower part of FIG. 1. The profile ensuing for a conventional reactor for autothermal reforming of hydrocarbons is plotted in broken lines.

The lower part of FIG. 1 shows clearly that the temperatures in the starting region of the reaction zone are higher than the limiting temperature $T_{limit}$ that is minimally required for complete conversion of the hydrocarbons. On one hand, this is due to the high educt concentrations in the starting region and, on the other hand, to the fast exothermic oxidation reactions occurring there in which such an amount of heat is released that temperatures of 900-1000° C. can be reached.

In contrast, in reformers of the prior art, the reaction rate in end region 5 of reaction zone 1 is not sufficient for complete conversion of the hydrocarbons (broken curve). This is attributable to the relatively low temperatures below a limiting temperature $T_{limit}$ of 650-700° C. and to a conversion-related reduced educt concentration in this region. This phenomenon is particularly pronounced at small excess-air factors of, for example, $\phi = 0.25$.

According to the present invention, the temperature in end region 5 of reaction zone 1 is raised by external heating, whereby the temperatures in this region are raised above limiting temperature $T_{limit}$ and the conversion of the residual hydrocarbons is accelerated (solid line).

Figure 2:
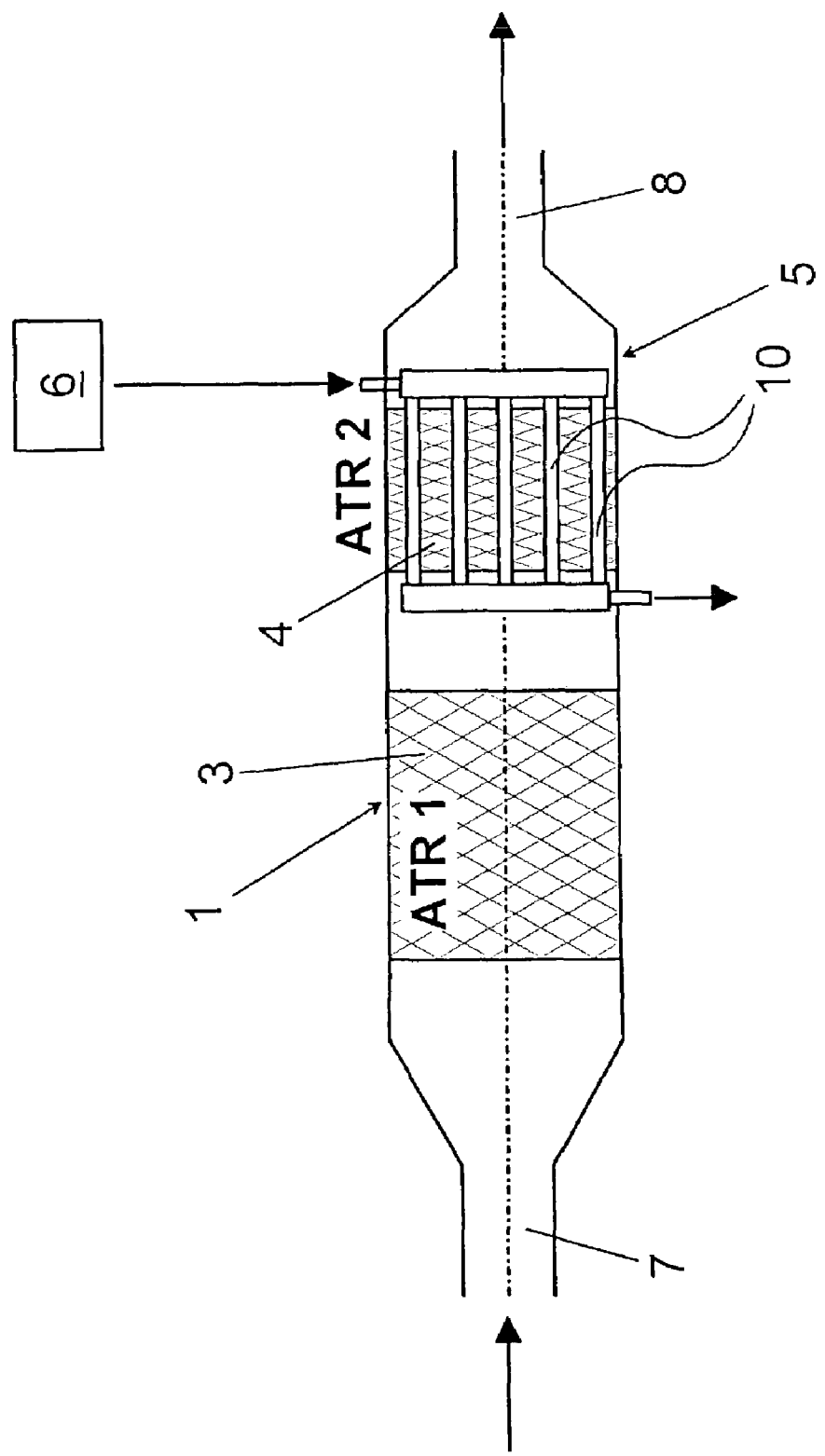
FIG. 2    shows a second variant of a reactor according to the present invention.

In the variant of an inventive reactor shown in FIG. 2, heat transfer tubes 10 in the form of a tube bundle are integrated in catalyst structure 4 which is arranged in end region 5 of reaction zone 1. These tubes can be the exhaust tubes of a catalytic radiant burner so that heat transfer tubes 10 are traversed by hot catalytic burner exhaust gases. Alternatively, heat transfer tubes 10 can also act as catalytic radiant burners themselves if a suitable catalyst is arranged in the interior thereof. To this end, the inner wall of heat transfer tubes 10 could, for example, be coated with a suitable catalyst. With the aid of heat transfer tubes 10 embedded in catalyst structure 4, it is also possible to externally heat reactors having larger diameters even if the temperature differences between the heat transfer tubes and the reaction zone are not all too high.

Figure 3:
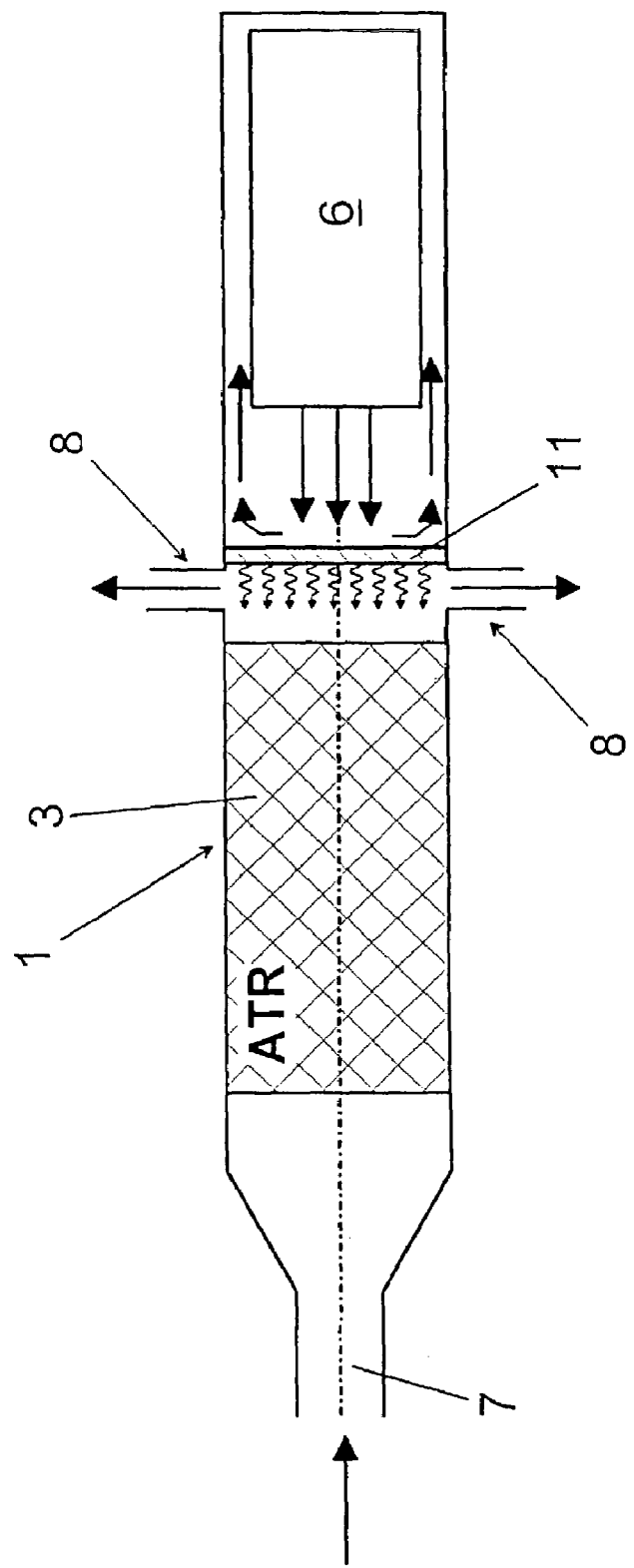
FIG. 3    shows a third variant of a reactor according to the present invention.

In the variant of an inventive reactor shown in FIG. 3, only the outlet cross-section of reaction zone 1 is heated by a correspondingly arranged radiator plate 11. The radiator plate is in thermal contact with exit zone 8 and is maintained at the required temperature by the exhaust gases of a catalytic radiant burner 6. This burner is located outside reaction zone 1. Here, the radiation-specific parameters emission factor and sight factor of end region 5 of reaction zone 1 are crucial for the rate of heat transfer.

Figure 4:
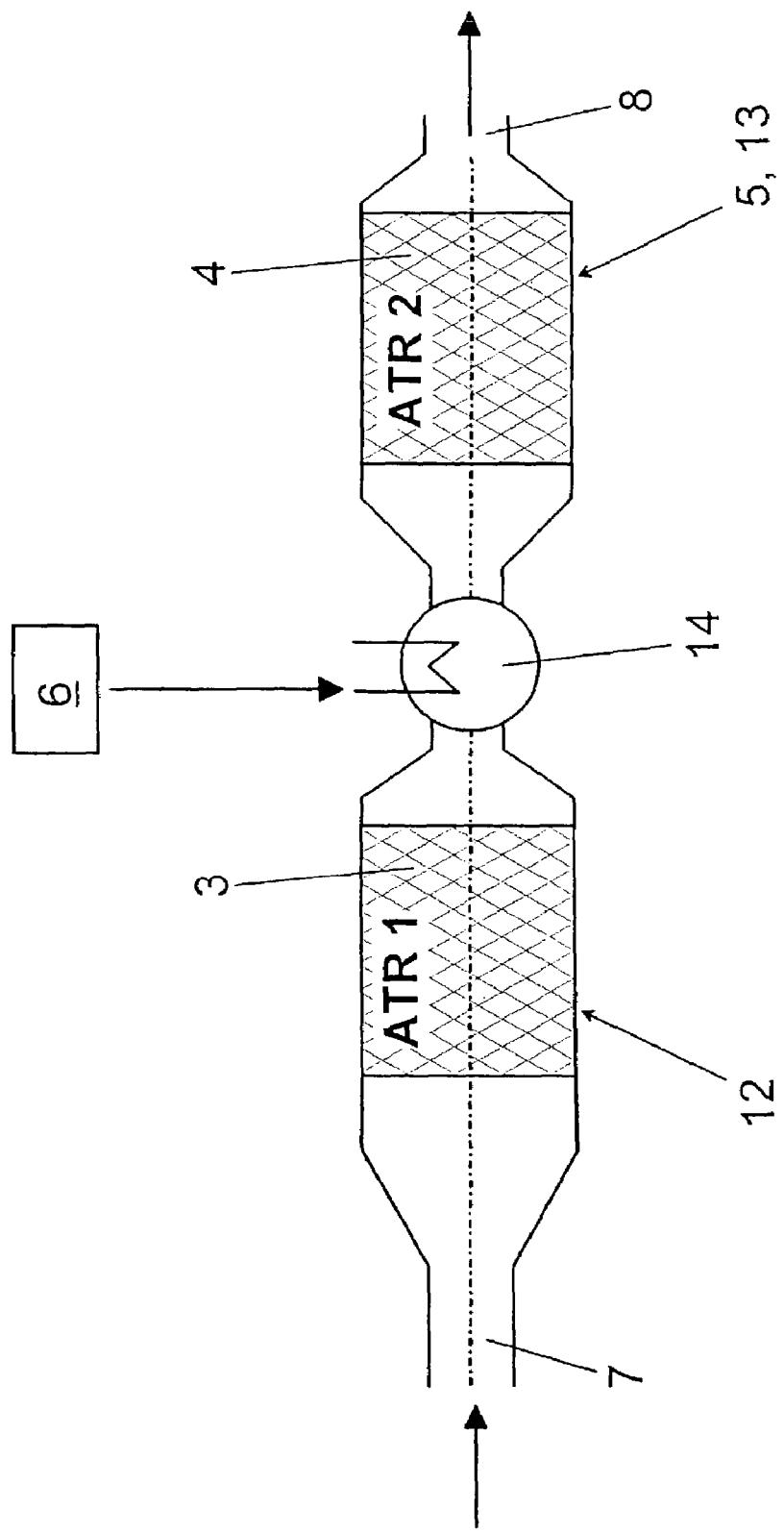
FIG. 4    shows a fourth variant of a reactor according to the present invention.

In the reactor shown in FIG. 4, reaction zone 1 includes a first partial zone 12 and a second partial zone 13 connected downstream. Upstream of second partial zone 13, heating device is arranged for intermediate heating of the reformate stream. Here too, the heating device includes a catalytic radiant burner 6 and a gas/gas heat exchanger 14 which is arranged between first partial zone 12 and second partial zone 13 and fed with the exhaust gas of catalytic radiant burner 6. In this manner, the temperature of the reformate stream is raised in second partial zone 13. To ensure high transfer rates in this variant, it is required to adjust a high driving temperature gradient, sufficient heat exchanging surface and/or high heat transfer coefficients.

What is claimed is:

1. A reactor for an autothermal reformation of hydrocarbons comprising:
    a tubular reaction zone having an upstream end region and a downstream end region, educts flowing through the reaction zone from the upstream end region to the downstream end region;
    a wall surrounding the tubular reaction zone;
    at least one catalyst structure disposed in the reaction zone for converting the educts; and
    a heating device disposed adjacent to the wall and configured to heat the downstream end region for accelerating the converting of the hydrocarbons, the heating device including at least one catalytic radiant burner; wherein at least a portion of the at least one catalyst structure is disposed in the downstream end region, and wherein the heating device includes heat transfer tubes disposed in the at least one catalyst structure; and wherein at least one catalyst is arranged in the heat transfer tubes, and wherein the heat transfer tubes act as catalytic radiant burners.

2. The reactor as recited in claim 1 wherein the heat transfer tubes include exhaust tubes of a catalytic radiant burner.

3. The reactor as recited in claim 1, wherein the reaction zone includes an exit zone, the educts exiting through the exit zone and wherein the heating device is disposed outside the reaction zone and in thermal contact with the exit zone.

4. The reactor as recited in claim 3 wherein the heating device includes a radiator plate in thermal contact with the exit zone and the catalytic radiant burner having exhaust gases that heat the radiator plate.

5. A fuel cell system including a reactor for an autothermal reformation of hydrocarbons, the fuel cell system comprising:
    a tubular reaction zone having an upstream end region and a downstream end region, educts flowing through the reaction zone from the upstream end region to the downstream end region;
    a wall surrounding the tubular reaction zone;
    at least one catalyst structure disposed in the reaction zone for converting the educts; and
    a heating device disposed adjacent to the wall and configured to heat the downstream end region for accelerating the converting of the hydrocarbons, the heating device including at least one catalytic radiant burner; wherein at least a portion of the at least one catalyst structure is disposed in the downstream end region, and wherein the heating device includes heat transfer tubes disposed in the at least one catalyst structure; and wherein at least one catalyst is arranged in the heat transfer tubes, and wherein the heat transfer tubes act as catalytic radiant burners.

6. The reactor as recited in claim 1 wherein the wall defines the tubular reaction zone.

7. The reactor as recited in claim 1 wherein the wall is a single wall.

8. The reactor as recited in claim 1 wherein the educts flow in a single direction.

9. The reactor as recited in claim 1 wherein the upstream end region and the downstream end region are axially next to each other.

10. A fuel cell system including a reactor for an autothermal reformation of hydrocarbons comprising:
    a tubular reaction zone having an upstream end region and a downstream end region, educts flowing through the reaction zone from the upstream end region to the downstream end region;
    a wall surrounding the tubular reaction zone;
    at least one catalyst structure disposed in the reaction zone for converting the educts; and
    a heating device disposed adjacent to the wall and configured to heat the downstream end region for accelerating the converting of the hydrocarbons; and
    a fuel cell emitting gas, the gas being supplied to the heating device; wherein at least a portion of the at least one catalyst structure is disposed in the downstream end region, and wherein the heating device includes heat transfer tubes disposed in the at least one catalyst structure; and wherein at least one catalyst is arranged in the heat transfer tubes, and wherein the heat transfer tubes act as catalytic radiant burners.

11. The fuel cell system as recited in claim 10 wherein the heating device combusts the gas to heat the downstream end region.

12. The fuel cell system as recited in claim 10 wherein the fuel cell includes an anode and the gas is off-gas flowing from the anode.

13. The fuel cell system as recited in claim 10 wherein the heating device is a catalytic radiant burner.

* * * * *